May 26, 1959 — L. PERAS — 2,888,106
LUBRICATED MULTIPLE STAGE DAMPER
Filed June 1, 1956 — 2 Sheets-Sheet 1
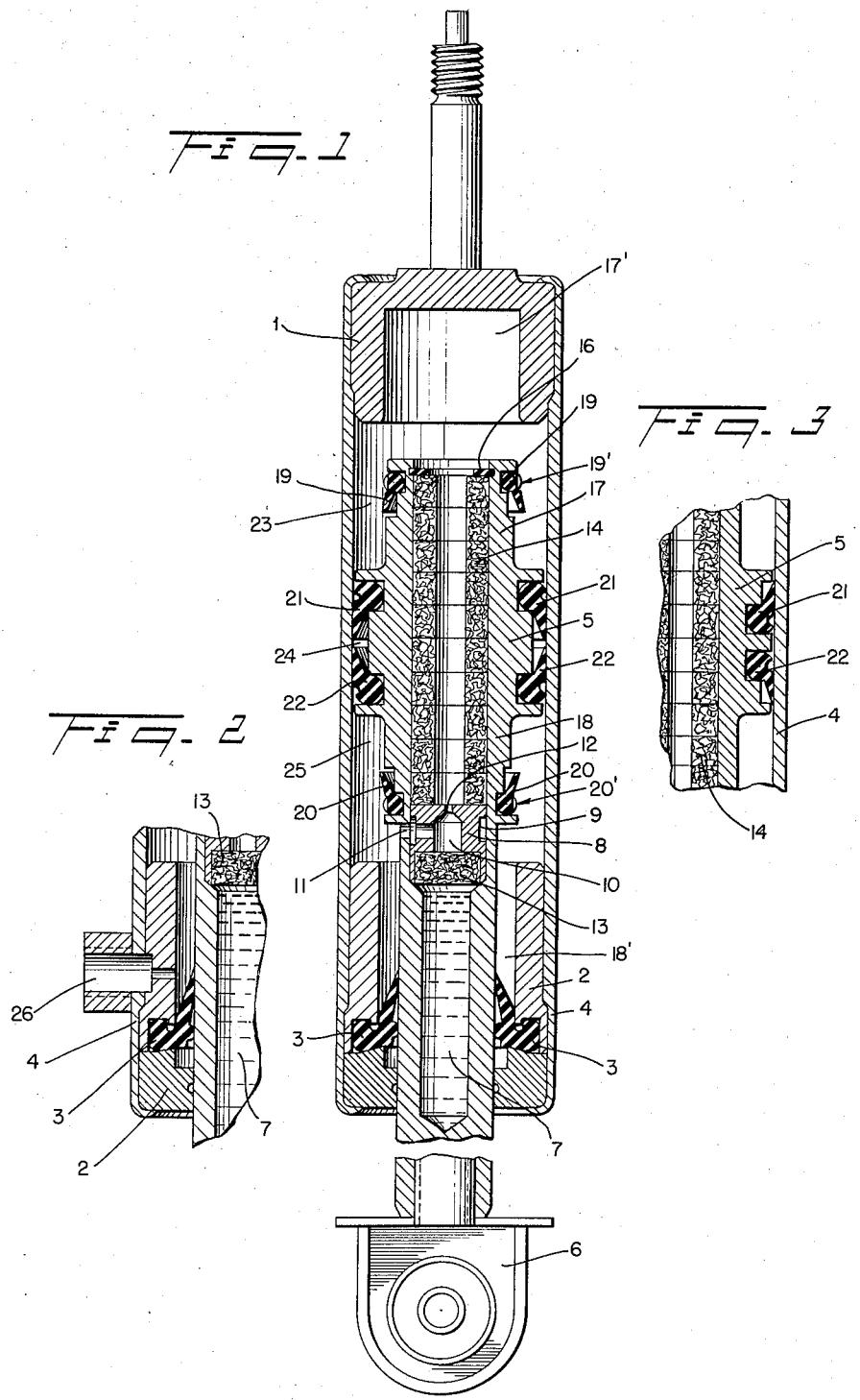

May 26, 1959  L. PERAS  2,888,106
LUBRICATED MULTIPLE STAGE DAMPER
Filed June 1, 1956  2 Sheets-Sheet 2
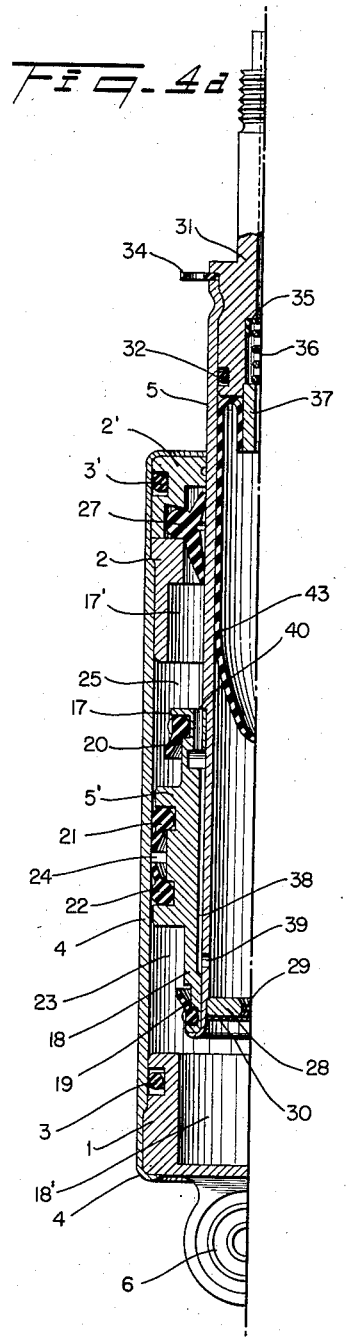
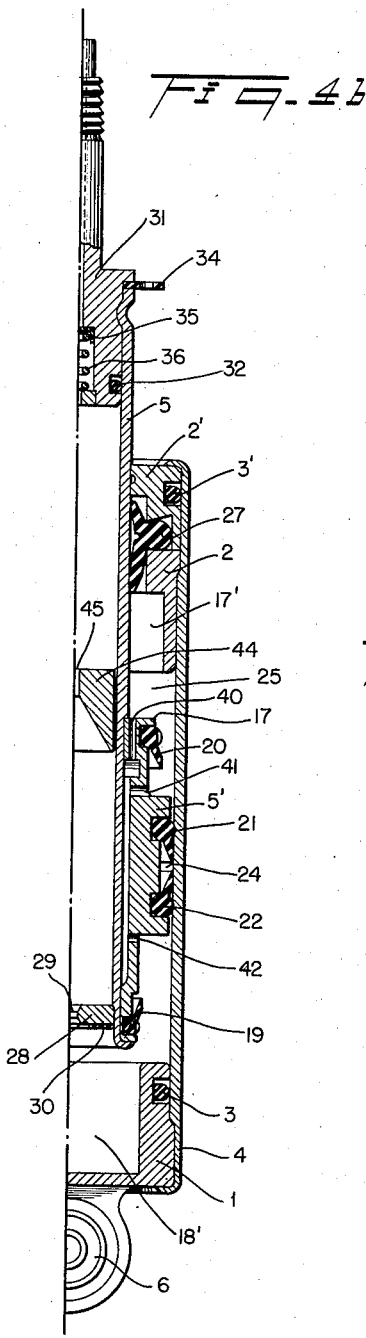
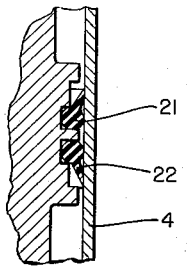

2,888,106
LUBRICATED MULTIPLE STAGE DAMPER

Lucien Peras, Billancourt, France, assignor to Regie Nationale des Usines Renault, Billancourt, France Application June 1, 1956, Serial No. 588,652

Claims priority, application France July 6, 1955

1 Claim. (Cl. 188—88)

The invention relates generally to shock absorbers and more particularly to a shock damper of the telescopic type, for use in the suspension of motor vehicles.

The apparatus forming the subject of the invention is characterised by a very great simplicity; in particular, it does not comprise any valves. Its life may therefore be regarded as practically unlimited. In a first embodiment according to the invention air is employed as the damping fluid and in a second embodiment oil is employed as the damping fluid.

On the accompanying drawing:

Fig. 1 is a longitudinal view of a section taken through the air damper;

Figs. 2 and 3 are fragmentary views in section showing modifications of details of the air damper;

Figs. 4a and 4b are longitudinal views of a section taken through the oil damper and are illustrative of two embodiments of the damper according to the invention;

Fig. 5 is a fragmentary view in section showing a detail of the damper in Fig. 4.

According to the invention, the air damper consists of a flanged member 1 fixed to the chassis of the vehicle. A lower flanged member 2, in one or two parts, carries a rimmed packing ring 3 of a material resistant to lubricants and the shape of which is derived from that described in the present applicant's U.S. patent application Serial No. 551,627 filed December 7, 1955 and entitled "Packing Ring." The packing ring 3 permits air to enter the damper. The damper body 4 is fixed in any known manner to the flanged members 1 and 2. It should be noted that this body may consist simply of a polished tube without any strict requirements as regards precision.

A piston and piston-rod assembly 5 carries at the bottom an attachment eye 6 or any other member which is fixed to the wheel assembly of the vehicle. The piston and piston-rod assembly 5 is hollow and contains an oil reservoir 7 inside it. A stopper 8 has a duct 10 which affords passage between its lower face and its lateral face, and which leads to a groove 9. An aperture or passageway 11 passes through the piston and piston-rod assembly opposite the groove 9. The stopper 8, which is rigidly connected to the piston and piston-rod assembly 5, likewise has a passageway of narrow section 12 bringing its upper and lower faces into communication. As will be explained below, some of the damping is effected by throttling the air in this aperture. The cross section of passageway 12 should be determined for each application of the damper. A lower recess 13 in the stopper 8 is filled with a spongy material which is porous to oil. Above the stopper 8 are arranged hollow rings 14 of spongy material which is porous to oil, which are retained by a resilient keeper ring 16. The piston and piston-rod assembly 5 comprises two cylindrical ends of narrow diameter 17 and 18 which can fit with a large clearance in corresponding bores 17' and 18' in the flanged members 1 and 2. The cylindrical portions 17 and 18 are provided with rimmed packing rings 19 and 20 of a type described in the aforementioned patent application filed the 7th of December 1955, entitled "Packing ring." The rims face in opposite directions as shown in the drawing. These packing rings 19 and 20 comprise notches 19', 20' in their flanges for allowing the passage of air. The rims are therefore disposed facing the large-diameter portion of the piston. It should be noted that when the cylindrical portions 17 and 18 of reduced diameter enter the corresponding bores in the flanged members 1 and 2, guiding is effected by the toroidal external surface of the packing rings 19 and 20.

The portion of the piston and piston-rod assembly 5 sliding in the body 4 comprises two simple rimmed packing rings 21 and 22 of the type mentioned above and the rims of which face one another. The guiding of the piston and piston-ring assembly is effected by the external toroidal portions of these packing rings.

The lower packing ring 3 is mounted in such a manner that its lower rim permits the passage of air from the outside to the inside of the damper.

The operation of the damper is as follows:

When the vehicle is stopped, the damper not yet having been used, the piston and piston-rod assembly 5 occupies substantially the position illustrated in Figure 1. On starting of vehicle movement, minor departures from the level of the ground cause a reciprocating movement of the piston rod 5. When the piston rod rises, the air is compressed at the top and the pressure is reduced at the bottom, which ensures, on the one hand, the downward passage of air through the apertures 12 and 11 with a damping effect, and on the other hand the entry of outside air along the lower portion of the piston and piston-rod assembly, through the rimmed packing ring 3. If a large bump is encountered, the portion 17 engages in the corresponding bore 17' in the flanged member 1. Air is compressed in the toroidal portion 23 of the cylinder 4 and when the apparatus begins to operate, this air inflates the cavity 24 disposed between the rims of the packing rings 21 and 22, pushing back the rim of the packing ring 21. This air can no longer escape and urges the rims of the packing rings 21 and 22 against the wall of the cylinder 4. The packing rings 21 and 22 then rub against the cylinder 4 and thus cause a certain damping. The pressure in the cavity 24 is determined by the volume of said cavity in relation to the volume of air imprisoned in the compartments 23 and 25.

On the rebound, a compression effect equivalent to that previously produced in the space 23 is produced in the toroidal portion 25. The air passes upwards through the apertures 10, 11 and 12 with a damping effect. Air penetrates from the outside through the packing ring 3 as soon as a state of reduced pressure is established below the piston and piston-rod assembly 5, but this air cannot escape again.

Summing up, after a few seconds of operation, the chamber 24 is full of compressed air and the rest of the apparatus is full of air at a certain pressure determined by the fact that at the lower dead center position of the piston and piston-rod assembly 5, the toroidal portion 23 is at atmospheric pressure. The damping effect is obtained both by the friction of the packing rings 21 and 22 against the cylinder 4, the throttling of the air in the aperture 12 and, at the end of the stroke, the compression of the air in the portions 23 or 25. The lubrication of the air is obtained by passage in contact with the spongy material in the rings 13 or 14 which are constantly supplied with the oil contained in the compartment 7 of the piston and piston-rod assembly.

The damping on compression and on the rebound may be rendered different by fixing different diameters and lengths for the cylindrical portions 17 and 18 and by arranging the packing rings 19 to 20 differently. Thus, design variables or parameters can be changed according to terrain that vehicle will operate in. There is thus sufficient latitude to adapt the damper to the vehicle to be equipped and to the contours of the road.

As a safety measure, a toroidal packing ring for damping the end of the stroke, made of rubber for example, may be provided on the faces of the flanged members 1 and 2, which could come into contact with the top and bottom of the piston 5.

If it is desired not to have any frictional damping, it is merely necessary to arrange the packing rings 21 and 22 as shown in Figure 3, in such a manner that there is no longer a portion inflated once and for all.

If compressed air is available, the body of the damper may be placed under pressure, with or without the interposition of a non-return valve. The compressed air is supplied through a pipe 26 (see Figure 2).

Figures 4a, 4b and 5 show an embodiment of the damper working with oil as the damping fluid and the construction of this apparatus is substantially the same as that of the air damper. The assembly of the apparatus is the reverse of the air type and the compensating air takes the place of the lubricating oil in the air embodiment.

Figure 4a shows a section through half the damper with a compensating balloon and Fig. 4b a section through half the damper with the air separated from the oil by a float. In these embodiments the similar elements have the same reference numerals.

Figure 5 shows a modification of the arrangement of the piston rings.

The damper in these embodiments consists of a body 4 closed at the lower end by a flanged member 1 with a packing ring 3. This flanged member 1 carries an eye 6 which serves to mount the damper on the axle of the vehicle. At its top, the body 4 is closed by a flanged member 2, 2' in two parts, carrying the packing ring 3'. The piston rod passes through this flanged member 2, 2', through a double-rimmed packing ring 27 of the type described in the applicant's patent quoted above. Said packing ring 27 effects the sealing between the atmosphere and the inside of the damper which is filled with oil. The piston rod 5 is hollow; it is closed at its lower end by a ring 28 provided with a calibrated hole 29 and held in position by a resilient washer 30. As its upper end, it is closed by a ferrule 31 threaded at the end for attachment to the chassis of the vehicle. The ferrule 31 carries a packing ring 32. It is fixed by any suitable means to the rod 5, here by riveting for example. A ring 34 serves for fixing a rubber dust-protecting bellows not illustrated.

The ferrule 31 is hollow and has a valve consisting of a needle 35, a spring 36 and a mouth 37. This valve enables air to be introduced into the damper to increase the pressure inside the apparatus.

A piston 5' is riveted to the piston rod 5. Its shape is that illustrated on the drawing. The piston 5' has a maximum diameter slightly less than the bore of the body 4. The guiding is effected by simple rimmed packing rings 21, 22 without any feed grooves, arranged either as shown in Figure 4 or as shown in Figure 5. In the case in Figure 4, these packing rings form a toroidal cavity 24. These packing rings are of the type described in the applicant's patent application heretofore referred to above. The piston 5' has at the top a cylindrical portion 17 of reduced diameter which enters a corresponding recess 17' in the flanged member 2 upon reciprocation of the piston. At the bottom, the piston 5' likewise has a cylindrical portion 18 of reduced diameter which can enter a corresponding recess 18' in the flanged member 1. The assembled piston unit 5, 5' forms an annular chamber 38 which is in communication with the inside of the piston rod 5 through holes 39 of a fairly large diameter and in communication with the space above the piston through fairly large holes 40, and in communication with the upper external portion of the piston through a calibrated hole 41 and with the lower external portion of the piston through a calibrated hole 42. The portions 17 and 18 of the piston 5' are provided with rimmed packing rings 19 and 20 provided with supply grooves, of the same type as described in the applicant's co-pending patent application referred to heretofore. The diameters of the portions 17 and 18 and the arrangement of the packing rings 21 and 22 are designed in such a manner that the required damping characteristics are obtained on compression and on the rebound of the apparatus.

The damper is completely filled with special oil. The embodiment illustrated in Fig. 4a shows a rubber balloon 43 full of air separating the air from the oil. In the embodiment illustrated in Fig. 4b, there is provided a float 44 of light material, which is not attached by the oil and will not deteriorate, provided with a small hole or restricted passage 45. The spaces in the body of the damper below and above the piston 5' are indicated by 23 and 25 respectively.

The operation of the oil damper in Figs. 4a and 4b is as follows:

When the vehicle on which the damper is mounted is at rest, the piston occupies substantially the position illustrated in Figs. 4a and 4b. If it is now assumed that the vehicle is travelling, passage over small bumps will cause a downward movement of the piston following minor oscillations and the oil in the space 23 will pass through the calibrated orifice 29, the large orifices 39, the annular conduit 38 and the conduits 40 and 41 into the space 25 at the top of the piston. The damping is regulated by the loss of head in the orifice 29.

If a large bump is encountered, the portion 18 engages in the corresponding bore 18' in the flanged member 1, 1'. Oil is then placed under pressure in the portion 23 of the cylinder 4 and this oil communicates its pressure to the oil in the cavity 24 between the rims of the packing rings 21 and 22. This pressure is then maintained in such a manner that the packing rings 21 and 22 rub against the cylinder 4 and thus cause a certain damping effect. The oil under pressure in the portion 23 can escape through the calibrated hole 42 and it is the cross-sectional area of this hole 42 which determines the maximum pressure in space 23, allowance being made for the violence of the shocks to which the axle of the vehicle is subjected.

On the rebound, an equivalent compression effect is produced in the space 25. The pressure in space 25 is determined by the cross-sectional area of the orifices 41 and 40. The damping effect is then obtained by the friction of the packing rings 21 and 22 against the cylinder 4 and the throttling of the oil in the orifice 29. At the end of the stroke, the damping is caused by the excess pressures in spaces 23 and 25. If it is desired not to have any frictional damping, the packing rings 21, 22 are arranged as in Figure 5.

The damping on compression and on the rebound may be rendered different by providing different diameters and lengths for the cylindrical portions 17 and 18 and by arranging the packing rings 19 and 20 differently.

The compensation for the reduction in the volume available for the oil is made at the expense of the pressure of the air contained in the balloon 43 or above the float 44.

I claim:

A shock absorber comprising, a fluid filled cylinder member, a piston reciprocable in said cylinder with peripheral clearance, the piston having a substantially center body portion with peripheral clearance and opposite end portions each having a reduced diameter, means at opposite ends of the cylinder defining a first and a second chamber of reduced diameters at opposite ends of the cylinder for receiving said opposite end portions of the piston when said piston is reciprocated a given distance under the action of forces moving the piston and cylinder relative one another, means for causing movement of the cylinder and piston relative one another upon the application of forces having components acting in a direction axially of the cylinder, the piston having an axial bore open at least at one end of the piston and being provided with means defining at least one passageway providing communication between the axial bore and the interior of the cylinder generally adjacent the piston end portion opposite to the other piston end portion having the open end of the axial bore thereby to provide fluid communication between the cylinder portions on opposite sides of the piston center portion, at least one annular packing member on said center portion for slidably guiding the piston along the cylinder walls and for substantially precluding fluid flow past the piston center body portion, an annular packing member on each of said piston end portions for slidably guiding the end portions when disposed in said first and second chambers and for substantially precluding fluid flow out of said chambers past said packing members, said cylinder being filled with air substantially at atmospheric pressure when said cylinder and said piston are at a rest position, a plurality of superposed ring members of a spongy material having the characteristic of being porous to oil disposed lining said bore, said means defining said passageway further defining a third chamber in said piston with said passageway providing communication between the third chamber and the interior of the cylinder and further defining a restricted passageway providing communication between the third chamber and said axial bore interiorly of the ring members, said piston having an oil filled reservoir in communication with said third chamber whereby the cylinder walls are lubricated by oil carried by the air upon reciprocation of the piston relative to the cylinder.

References Cited in the file of this patent

UNITED STATES PATENTS

| | | |
|---|---|---|
| 456,016 | Canet | July 14, 1891 |
| 845,827 | Steedman | Mar. 5, 1907 |
| 1,278,350 | Hubbard | Sept. 10, 1918 |
| 1,488,197 | Demke et al. | Mar. 5, 1924 |
| 2,349,244 | Brown | May 23, 1944 |
| 2,752,149 | Porcellini | June 26, 1956 |
| 2,819,064 | Peras | Jan. 7, 1958 |

FOREIGN PATENTS

| | | |
|---|---|---|
| 407,516 | Great Britain | Mar. 22, 1934 |
| 117,466 | Sweden | Oct. 22, 1946 |
| 203,299 | Switzerland | June 1, 1939 |